United States Patent [19]

Prockter et al.

[11] Patent Number: 4,794,542
[45] Date of Patent: Dec. 27, 1988

[54] SIGN GENERATING APPARATUS WITH INPUT OF SECOND SIGN INFORMATION WHILE CUTTING A FIRST SIGN

[76] Inventors: Jules Prockter, 73 Butternut La., Vernon, Conn. 06066; Charles Hevenor, Jr., 24 Toomey La., Bolton, Conn. 06040

[21] Appl. No.: 881,187

[22] Filed: Jul. 2, 1986

[51] Int. Cl.$^4$ ............................................. B43I 11/00
[52] U.S. Cl. ................................ 364/474.02; 364/189; 364/474.09; 364/474.22; 101/128.4; 33/18.2; 346/139 B
[58] Field of Search ................ 364/474, 475, 132, 520, 364/191, 192, 193, 200 MS File, 900 MS File, 188, 189; 346/139 B; 101/128.4; 33/18.2

[56] References Cited

U.S. PATENT DOCUMENTS

| | | | |
|---|---|---|---|
| 4,327,615 | 5/1982 | Gerber et al. | 83/49 |
| 4,435,772 | 3/1984 | Suzuki et al. | 364/520 |
| 4,467,525 | 8/1984 | Logan et al. | 346/139 B |
| 4,554,635 | 11/1985 | Levine | 364/475 |
| 4,706,002 | 11/1987 | Fukuyama | 318/568 |

Primary Examiner—Jerry Smith
Assistant Examiner—Allen MacDonald

[57] ABSTRACT

A sign generating apparatus comprises a keyboard for entering first sign data and second sign data, a processor for supervising the data input during intervals, and a cutting apparatus for cutting a first sign based on the first sign data and a second sign based on the second sign data. The processor is programmed to supply cutting vectors to the cutting apparatus in between the intervals in which it supervises the data entry so that the cutting apparatus is capable of cutting the first sign while the second sign data is entered through the keyboard. The processor is also programmed to determine the layout of the second sign and supply cutting vectors to the cutting apparatus in an overlapped manner. The processor is also programmed to supply display vectors to a graphics controller and supply cutting vectors to the cutting apparatus in an overlapped manner.

19 Claims, 7 Drawing Sheets

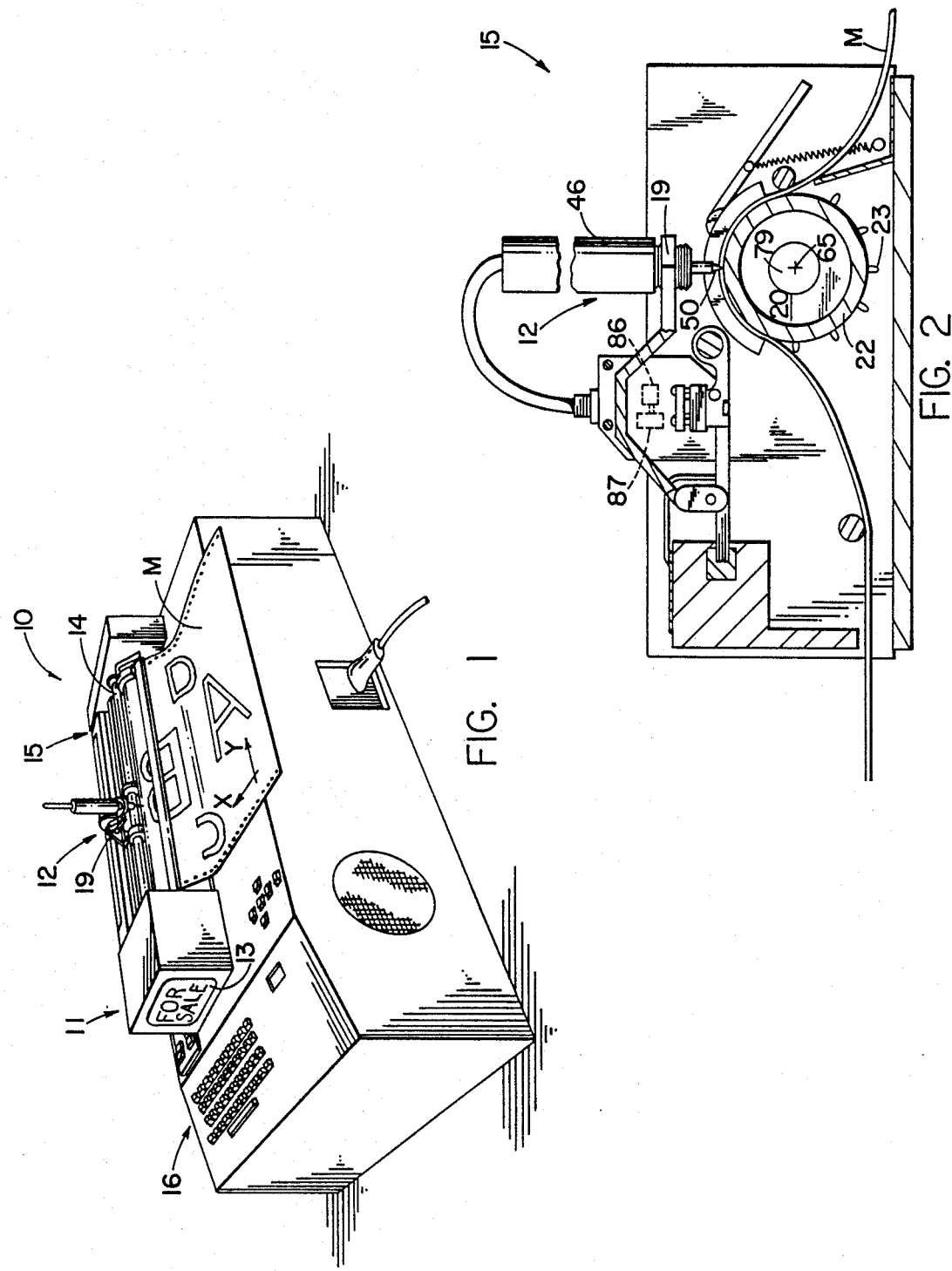

SIGN GENERATING APPARATUS WITH INPUT OF SECOND SIGN INFORMATION WHILE CUTTING A FIRST SIGN

BACKGROUND OF THE INVENTION

The invention relates generally to sign generating apparatus and processes and deals more particularly with an efficient sign generating apparatus which is capable of cutting a sign while interacting with an operator to define the layout of another sign or perform other operations.

A previous sign generating apparatus is disclosed in U.S. Pat. No. 4,467,525 to Logan and Sullivan which patent issued on Aug. 28, 1984, is assigned to the assignee of the present invention and is hereby incorporated by reference as part of the present disclosure. The '525 sign generating apparatus comprises a web feeder, a tool to selectively plot sign characters on plotting paper or cut sign characters from sign generating stock while the web is fed, and a system microprocessor programmed to direct the cutting and plotting operations according to data input by an operator. The data may include a font type, a line height and a line of sign text. The font provides vectors defining the character shapes, a standard width of each character and a standard space between the characters. After the data entry, the system microprocessor determines sign vectors based on the font vectors and other data input by the operator and transmits the sign vectors to a machine controller which also includes a microprocessor. The machine controller converts the sign vectors to servo commands and transmits them to X and Y drive motors which are responsible for relative motion between the cutting or plotting tool and the web material to trace the desired sign. Often the operator directs the microprocessor to plot the sign on plotting paper to check the appearance of the sign text before the relatively expensive sign generating stock is utilized. If the operator is dissatisfied with the sign appearance, then he or she can enter new data into the system microprocessor defining another shape or size of sign text. The data entry, sign layout, and testing processes may be repeated additional times if desired.

After the operator arrives at a satisfactory sign text appearance, the operator may direct the system to cut one or more sets of the characters from the sign generating stock. If many sets of characters are desired, then the cutting process may require a significant amount of time and during such cutting time, the operator may be idle because the '525 system is not equipped to interact with the operator to define the shape and size of text of another sign during the cutting process.

Accordingly, a general object of the present invention is to provide efficient sign generating apparatus and processes for cutting a first sign while interracting with an operator to define the layout of a second sign.

A more specific object of the present invention is to provide sign generating apparatus and and processes of the foregoing type which are also capable of calculating the layout of the sccond sign or displaying the second sign layout on a video monitor during the cutting of the first sign so that the operator does not have to wait while the first sign is being cut before proceeding with the second sign data entry and layout.

Another specific object of the present invention is to provide sign generating apparatus and processes of the foregoing types which do not have a large computer requirement.

Still another specific object of the present invention is to provide sign generating apparatus and processes of the foregoing types which require only one bank of fonts to support both the laying out, displaying and cutting operations.

SUMMARY OF THE INVENTION

The invention resides in an efficient sign generating apparatus which is capable of cutting a sign while interracting with an operator to define the layout of another sign. The apparatus comprises a keyboard for entering first sign data and second sign data, a processor for supervising the data entry, and a cutting apparatus for cutting a first sign based in part on the first sign data and a second sign based in part on the second sign data. The processor is programmed to supply cutting vectors to the cutting apparatus in between the intervals that the processor supervises the data entry so that the cutting apparatus is able to cut the first sign while the data defining the second sign is entered through the keyboard.

According to one feature of the invention, the cutting apparatus generates an interrupt signal when it requires a cutting vector to further define its cutting course and transmits the interrupt signal to the processor means. The processor means is programmed to recognize the interrupt signal and interrupt what it is currently doing to calculate and transmit such a cutting vector to the cutting apparatus. Afterwards, the processor returns to what it was doing before the interruption.

According to another feature of the invention, the processor is programmed to determine a first signal layout according to the first sign data and a second sign layout according to the second sign data. While the processor determines the second sign layout, it is programmed to respond to interrupts by the cutting apparatus, supply suitable cutting vectors, and then return to its determination of the second sign layout.

According to another feature of the invention, the sign generating apparatus includes a video display to display the sign layouts before cutting. The processor directs the display and is programmed to respond to interrupts by the cutting apparatus to supply cutting vectors in overlapped relation with its direction of the video display.

The invention also resides in related processes.

BRIEF DESCRIPTION OF THE FIGURES

FIG. 1 is a perspective view of a sign generating apparatus in which the invention is embodied.

FIG. 2 is a fragmentary sectional view of the sign generating apparatus of FIG. 1 showing a tool head and a material feeding assembly.

DETAILED DESCRIPTION OF THE PREFERRED EMBODIMENT

Figure 3:
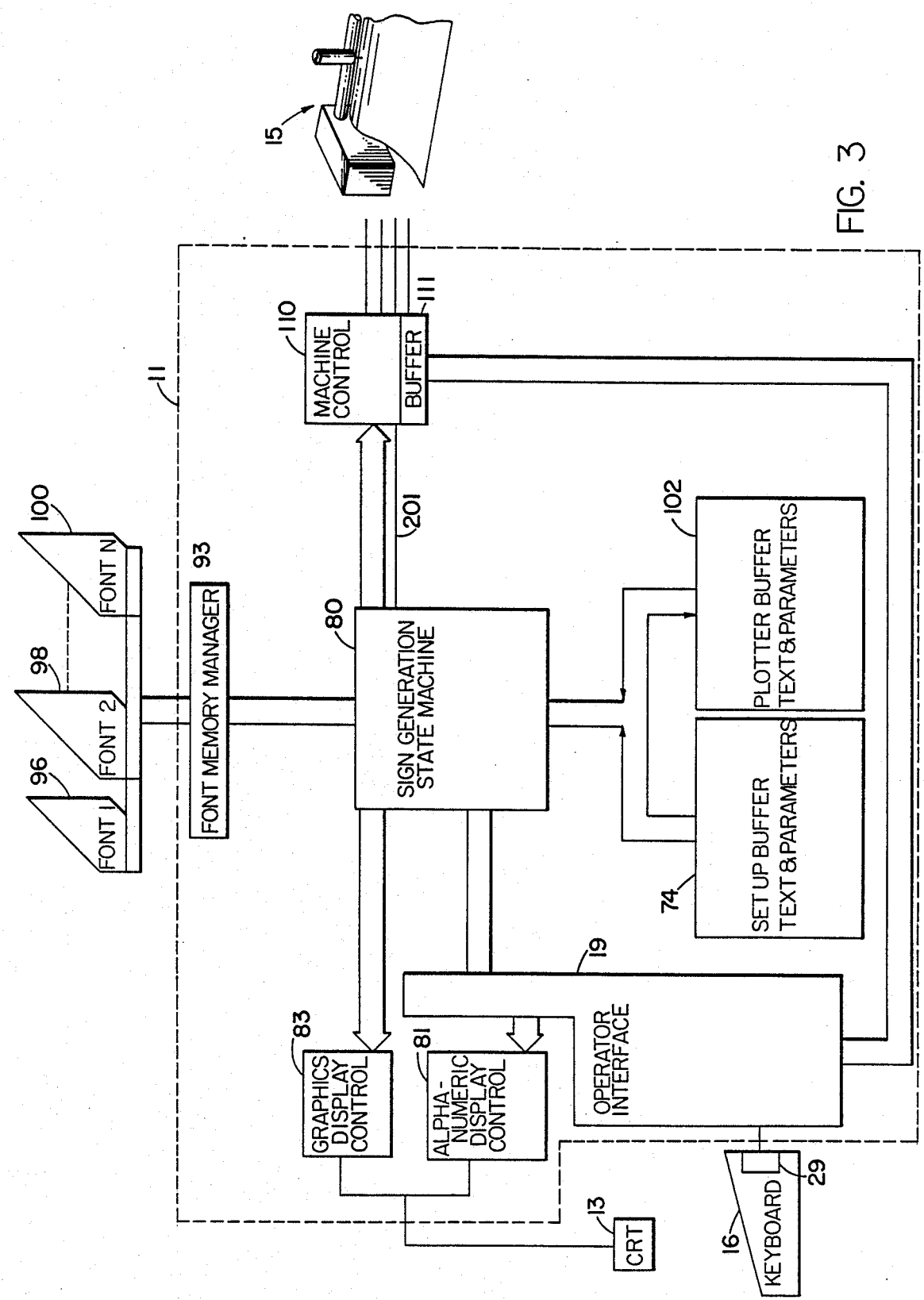
FIG. 3 is a block diagram schematically illustrating electronic circuitry within the sign generating apparatus of FIG. 1.

Turning now to the figures, FIG. 1 illustrates a sign generating apparatus, generally designated 10 in which the invention is embodied. The apparatus 10 includes a keyboard 16 for entering data defining a desired sign, and a computer controller 11 for supervising the data entry, determining a sign layout based on the data, and controlling a sign cutting operation. The apparatus 10 also includes a cutting and plotting machine 15 for cutting or plotting the layed out sign, and a CRT or video monitor 13 for instructing the operator how to use the system during the data entry phase and for displaying a layed out sign prior to cutting.

As shown in FIGS. 1 and 2, the cutting and plotting machine 15 comprises a cutting and plotting tool head 12 which is slidably mounted on a guiderail 14. A Y-servomotor 86 and a pulley assembly 87 is coupled to a tool head carriage 19 and moves the tool head 12 laterally of the web M. The web M is fed longitudinally of itself under the cutting and plotting head 12 by means of a feed roller 20 having feed sprockets 22,22 at opposite ends which feed sprockets have teeth 23,23 for engaging corresponding sprocket holes in the web material M. The feed roller 20 is rotably driven by means of an X-servomotor 79. Both servomotors 86 and 79 are controlled by command signals from the computer controller 11. Two dimensional characters and designs are formed by composite movements of the tool head 12 laterally of the web and of the web material longitudinally of itself. During cutting operations, a knife 50 is installed in the tool head 12 and sign generating web material is loaded into the machine 15. During optional plotting operations, a pen or pencil and a paper web are substituted. For a further description of components of the apparatus 10, reference may be made to U.S. Pat. No. 4,467,525 to Logan which was incorporated by reference above and to U.S. patent application Ser. No. 857,849 entitled APPARATUS AND METHOD FOR AUTOMATIC LAYOUT OF SIGN filed April 30, 1986 by Wood and Logan which is also assigned to the assignee of the present invention and hereby incorporated by reference as part of the present disclosure.

Focusing now on the present invention, FIG. 3 illustrates circuitry of the computer controller 11 and other components. The keyboard 16 is a standard alphanumeric keyboard and includes an encoder 29 which converts each keyboard entry to a corresponding digital signal. Through the keyboard 16, the operator may enter sign text, sign parameters such as font type, text line heights and a spatial factor or fixed margin sizes, the number of signs to be cut according to one layout, and commands such as "layout sign", "display sign" or "cut sign". The spatial factor indicates a desired level of openness to the overall sign appearance and it effects such dimensions as the margin sizes and spacing between the characters and lines of text as discussed in the aforesaid U.S. patent application Ser. No. 857,849. The apparatus 10 ordinarily includes a plurality of fonts 96,98 ... 100 which fonts define the shape of characters of the sign text and the standard spacing between them, and provides such information in the form of vectors. A system microprocessor (sign generation state machine) 80 accesses the fonts selected by the operator through a font memory mapping controller 93 which addresses the selected font via a common bus arrangement.

The encoded signals are supplied to an operator interface 19. Although the operator interface 19 is shown apart from a system microprocessor 80 in FIG. 3, this is only schematic because in a preferred embodiment of the invention the operator interface is actually a subroutine within the system microprocessor 80 which subroutine supervises the entry of data. The operator interface periodically reads the encoder 29, and if the encoder presents data, stores the data in a set-up buffer 74. The operator interface 19 also supplies a menu on the video monitor 13 via an alphanumeric controller 81 and also recalls previously entered data for display when commanded by the operator.

After the operator inputs a full set of data defining a sign layout, he or she may institute the sign layout command to direct the system microprocessor 80 to determine a sign layout based on the text and parameter data and a layout algorithm such as described in the aforesaid patent application or other algorithm. The layout algorithm may determine parameters defining the margin sizes, spacings of the sign characters and positioning of the lines of text, which parameters are also stored in the set up buffer 74. The system microprocessor 80 also utilizes the parameter data to determine vectors which define one or more optional sign borders or other designs on the sign. By way of example, if uninterrupted, the sign layout algorithm may require 200 milliseconds to complete according to the aforesaid patent application, although other layout algorithms may be used instead.

Also by way of example, the system microprocessor is a 16 bit model Z8002 and is programmed to participate in the display of the sign layout on the video monitor 13. Once commanded to display a sign layout, the graphics controller 83 is supplied with vectors from the microprocessor 80 as fast as the microprocessor 80 can generate them and and converts the vectors to scan signals which control the picture tube within the video monitor. By way of example, the microprocessor 80 is capable of transmtting a vector every 70 microseconds to the graphics controller 83. The graphics controller does not have any storage capability and so, converts the vectors to scan signals as it receives the vectors. In the event, as discussed below, that the transmission of such vectors from the system microprocessor 80 to the graphics controller 83 is interrupted, the graphics controller 83 is equipped to repeatedly refresh the screen with signals derived from the previously transmitted vectors until the microprocessor transmits new vectors to complete a video image.

After the operator views the sign layout on the video monitor 13, the operator can change the data if dissatisfied with the sign layout or can command that the text and operator entered parameters and other parameters calculated in the layout algorithm be transferred to a plotter buffer 102 and that one or more signs according to the data be cut by the machine 15. The plotter data buffer 102 is capable of storing many sets of sign data and by way of example, comprises a random access memory. When commanded to institute a cutting or plotting operttion, the system microprocessor 80 transmits plotter vectors, similar to those transmitted to the graphics controller 83 one at a time to a machine control processor 110 to direct cutting or plotting operations. The machine control processor 110 also includes a microprocessor which, by way of example, is a 16 bit model 8002 and is programmed to convert the plotter vectors to servomotor commands which control the X motor 79 and Y motor 86 to move the feed roller 20 and web material M in such a manner as to cause the cutting or plotting instrument to trace the desired characters, sign borders or other sign designs. Along with these vectors, the microprocessor transmits other control signals to the machine control processor 110 which directs the lowering and raising of the cutting or plotting tool by an appropriate actuator and rotation of the knife to maintain it tangent to the line of cut. The machine control processor 110 includes a buffer 111 to store a multiplicity of the plotter vectors transmitted by the system microprocessor 80. By way of example, the buffer 111 when filled contains enough vectors to direct up to many seconds of cutting or plotting motoon depending on the number of turns in the motion. If the sign contains many such turns, then the vectors are utilized rapidly to direct the tool movement and the buffer may be dissipated quickly.

To provide smooth transitions and continuous traces in a cutting or plotting operation and to expedite the operation, it is desirable that the buffer of the machine control processor not run out of plotter vectors until the sign is completely cut. To this end, the machine control processor is programmed, as described in more detail below, to request plotter vectors one at a time from the system microprocessor 80 whenever the machine control processor has room available in its buffer. By way of example, it may require 1-2 milliseconds for the system microproeessor 80 to respond to a request and calculate and transmit a vector to the machine control processor 110.

The system microprocessor 80 is programmed to provide several routines or subprograms including a data entry subroutine 190 (FIG. 4), a sign layout subroutine 192 (FIG. 5), a video display subroutine 191 (FIG. 6) and a service interrupt subroutine 204 (FIG. 3) in carrying out overlapped control of the keyboard 16, machine control processor 110, and the graphics controller 83.

Figure 4:
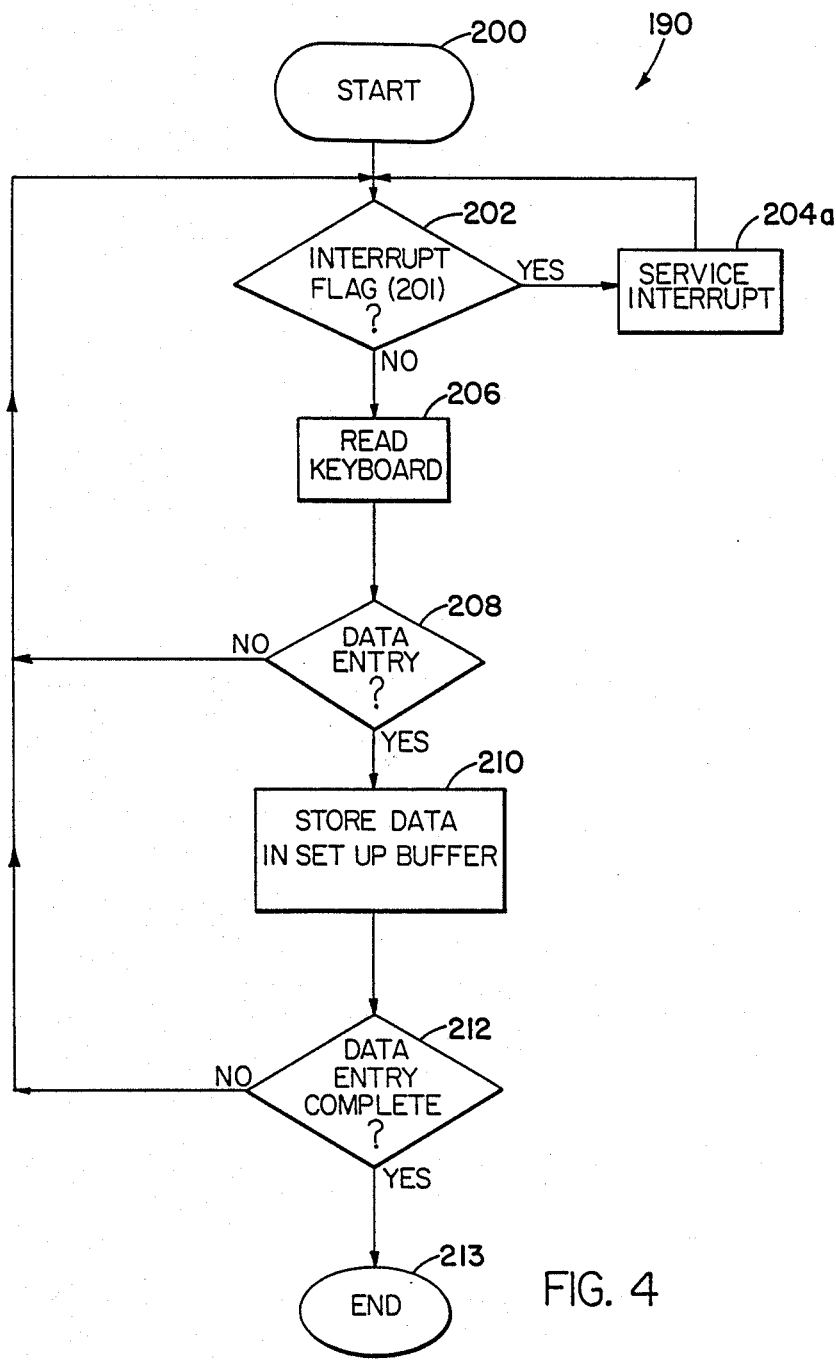
FIG. 4 is a flow chart illustrating a data entry process implemented by a system microprocessor within the sign generating apparatus of FIG. 1.

Turning now to FIG. 4, the data entry subroutine 190 begins by an operator making a start command through the keyboard 16 (step 200). Next, the system microprocessor 80 checks an interrupt flag line 201 (FIG. 3) to determine whether the machine control processor 110 requires attention (step 202). As discussed in more detail below, the attention required by the machine control processor 110 is the transmission of a motion command for the plotting or cutting tool of the machine 10 in accordance with the sign text and layout (step 204a). When in need of such a motion command, the machine control processor 110 sets the flag and the system microprocessor 80 services it (step 80) as discussed in more detail below (step 204a). By way of example, the fastest keyboard operator can input less than 10 characters per second so that the time between data entries is typically greater than 100 milliseconds and the time required by the encoder 17, operator interface 19 and set up buffer 74 to process the data entry is less than 100 microseconds. Consequently, between each data entry, there are more than 99 milliseconds per data entry when the system microprocessor 80 is not required to actively participate in the data entry operation and can attend to the machine control processor 110. It should be noted that until one sign has been layed out and its data is subsequently stored in the plotter buffer 102, the machine control processor 110 will not ordinarily be activated to request servicing.

The machine control processor 110 runs asynchronously with the system microprocessor 80 so that the system microprocessor cannot ordinarily predict the timing of the interrupts generated by the machine control processor 110. If there was no interrupt flag read in the step 202, the system microprocessor 80 proceeds to read the keyboard encoder 29 outputs to determine if the operator has entered new data through the keyboard (step 206). If there has not been a data entry detected in step 206 (step 208), the system microprocessor 80 moves back to the step 202 to again check the interrupt line 201. On the other hand, if there has been a data entry (step 208), the system microprocessor 80 proceeds to store the data entry in the set up buffer 74 (step 210). If the operator has completed his or her data entry defining a sign (step 212), then the data entry subroutine 190 is done (step 213) and if not, the system microprocessor 80 loops back to the step 202 to again check the interrupt line 201.

Figure 5:
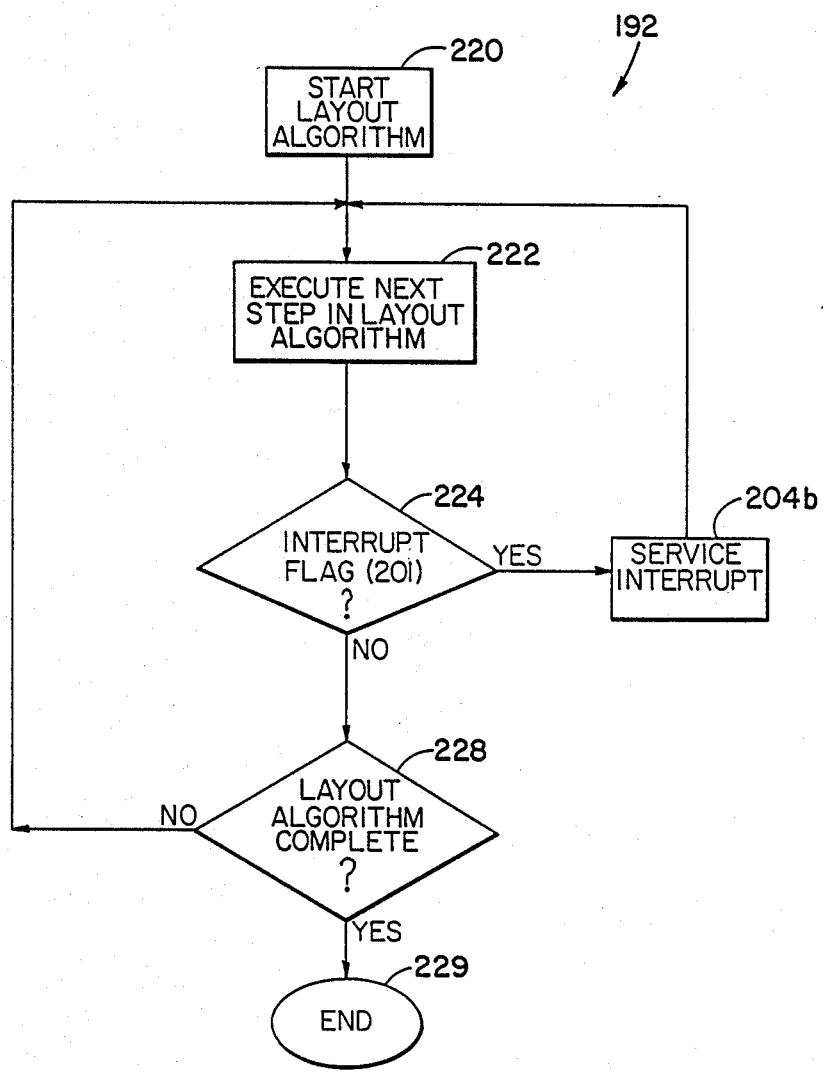
FIG. 5 is a flow chart illustrating a sign layout subroutine implemented by the system microprocessor.
Figure 6:
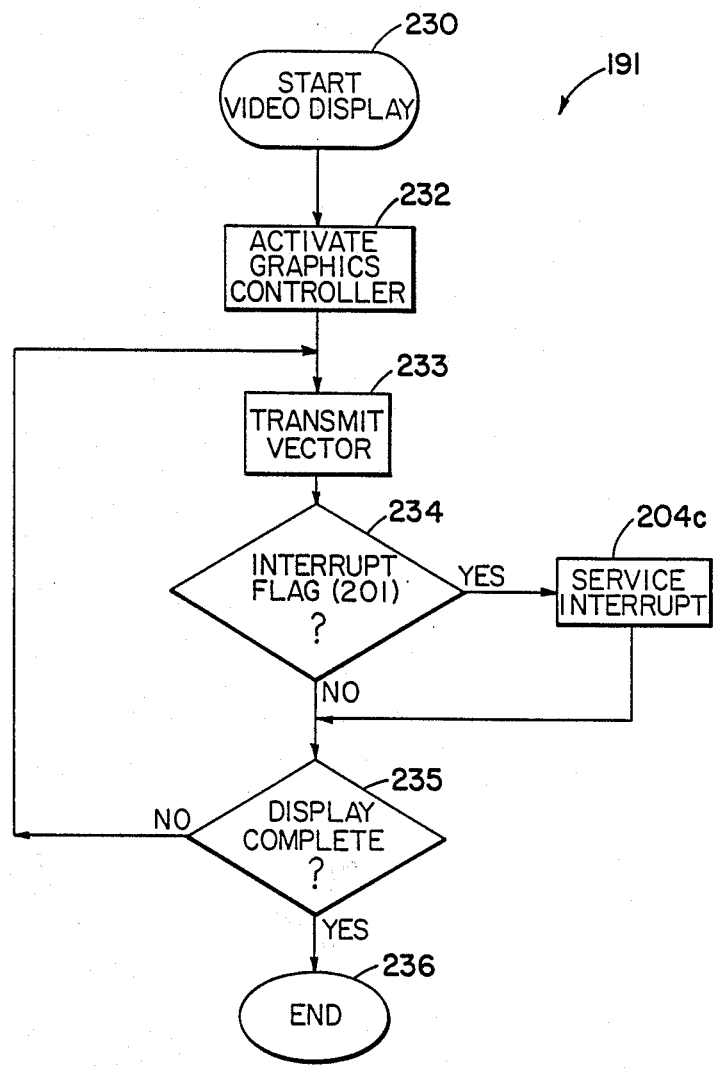
FIG. 6 is a flow chart illustrating a video display subroutine implemented by the system microprocessor.

Next, through the keyboard 16, the operator may direct the system microprocessor 80 to execute its sign layout algorithm subroutine 192 and this step is labeled 220 in FIG. 5. After the layout subroutine is initiated, the system microprocessor 80 executes one or a few steps in its layout subroutine (step 222). Then the system microprocessor 80 checks the interrupt line 201 (step 224) to determine whether the machine control processor 110 requires attention. A servicing subroutine (step 204b) will be discussed in more detail below. If there was no interrupt flag on the interrupt line 201, the system microprocessor moves back to the step 222 via a step 228 to execute the next step or few steps in the layout algorithm because at this stage the layout algorithm has not yet been completed (step 228). If there was an interrupt flag, the system microprocessor services the interrupt (step 204b) as discussed in more detail below and then loops back to the step 222. After many iterations of steps 222-228 the layout algorithm is completed (step 229).

Then the operator can command through the keyboard 16 that the sign data be transferred to the plotter buffer 102 for use in a subsequent cutting or plotting operation or can initiate the video display algorithm 191 (FIG. 6) to display the layed out sign on the video monitor 13 (step 230). If the operator requests such a display, then the system microprocessor 80 activates the graphics controller 83 (step 232), and then transmits a vector to the graphics controller, (step 233). Then the system microprocessor checks the interrupt line 201 (step 234) to determine whether the machine control processor 110 requires attention. If not, the system microprocessor loops through the steps 234 and 233 and supplies another vector to the graphics controller. The vectors transmitted to the graphics controller 83 are similar to those transmitted to the machine control processor except that the graphics controller vectors are suitably scaled to correspond to the relatively small screen size and are translated to accommodate the display characteristics of the screen. Upon receipt of each vector, the graphics controller 83 converts the information contained in the vector to suitable control signals for the picture tube of the video monitor 13. After the entire layout has been displayed on the video monitor 13 (step 234) a decision step 235 leads to the end of the display algorithm 191 (step 236).

If the operator is satisfied with the layout displayed on the monitor 13, then, the operator may instruct the system microprocessor 80 that the data previously entered through the keyboard and the layout data is acceptable for subsequent cutting. In which case, the entered data and layout are transferred to the plotter buffer 102 to be used by the system microprocessor 80 to direct a subsequent cutting operation. If the layout displayed on the video monitor 13 is not acceptable, the operator has the opportunity to return to the step 200 of the data entry subroutine 190 and enter new data through the keyboard 16 to alter the sign layout. By way of example, such new data may indicate new sign text or designs, new line heights, new margin sizes, or a new spatial factor. After the entry of new data, the operator has the opportunity again to execute another sign layout subroutine by a suitable command through the keyboard 16 (step 220) and another video display subroutine 191.

After acceptable layout data has been stored in the plotter buffer 102, the operator has the opportunity to signal the machine control processor 110 to begin cutting one or more signs according to the data (step 260 of FIG. 7) and then enter new data defining another sign to begin the process again. After signalling the machine control, the machine control 110 begins its own plotting subroutine 261 and determines whether its buffer 111 is full (step 272). Because the buffer 111 is not yet full, the microprocesor 110 requests a motion command 262 from the system microprocessor 80 by setting the interrupt line 201. In general the motion commands can take several forms, for example, a vector which indicates a starting point or course for the cutting tool 12, a command to lower the cutting tool into engagement with the web material M or a command to rotate the cutting tool to maintain the blade in alignment with the cutting direction. When the system microprocessor 80 reads the interrupt line 201 (steps 202,224 or 234), it temporarily exits the subroutine that it is currently executing and services the interrupt step 204 a, b or c. It should be noted that when the system microprocessor 80 is not involved in executing either subroutine 190, 191 or 192, it nevertheless repeatedly monitors the interrupt line 201 for interrupts from the machine control processor 110.

To service the interrupt, the microprocessor 80 stores all the data held in its arithmetic and logic unit and other volatile data existing at the interrupt point in the subroutine which it is currently executing (the data entry subroutine 190, the video display subroutine 101 or the sign layout subroutine 192) and also stores a program counter indicating the step in the respective subroutine where the microprocessor 80 leaves off. Then the microprocessor 80 calculates the appropriate motion command utilizing the information in the plotter buffer 102 and vectors from the previously selected font 96, 98 or 100 and transmits the vectors to the processor 110. Then, the system microprocessor 80 stores in memory, information indicating where the system microprocessor 80 leaves off in its supply of motion commands or other vectors to the machine control processor 110.

Figure 8:
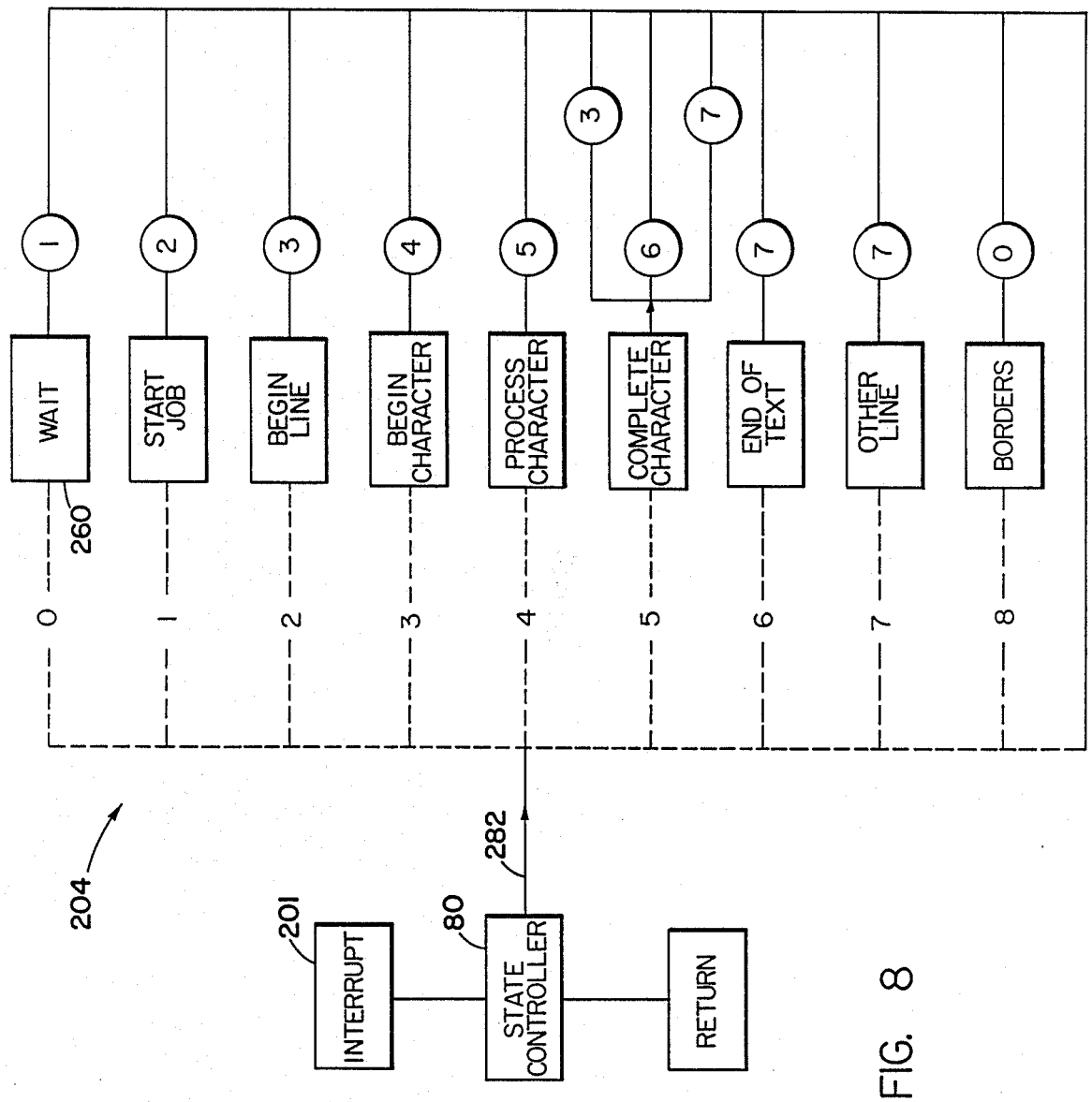
FIG. 8 is a state diagram illustrating a subroutine implemented by the system microprocessor when servicing the machine controller.

The aforesaid algorithm 204 for servicing an interrupt from the machine control processor 110 is illustrated in FIG. 8. In the present example, the machine control processor 110 is requesting its first motion command so that the system microprocessor 80 proceeds to state number 1 and generates a start job signal indicating that a new sign is to be cut. Then the microprocessor 80 stores a note (symbol 2) in its memory that it has transmitted the start job signal to the machine control processor 110. This notation step and others following the transmittal of each motion command are indicated schematically by an arrow 282 which serves as a program counter indicating where the system microprocessor 80 is to resume calculating the next motion command upon recognition of the next interrupt on line 201. Then, the system microprocessor 80 returns to the subroutine that it was executing before interruption by the machine control processor at the step 262 (either the data entry subroutine 190, the sign layout subroutine 192 or the video display subroutine 191) and utilizes the stored data and program counter of the subroutine to determine where and how to continue.

Figure 7:
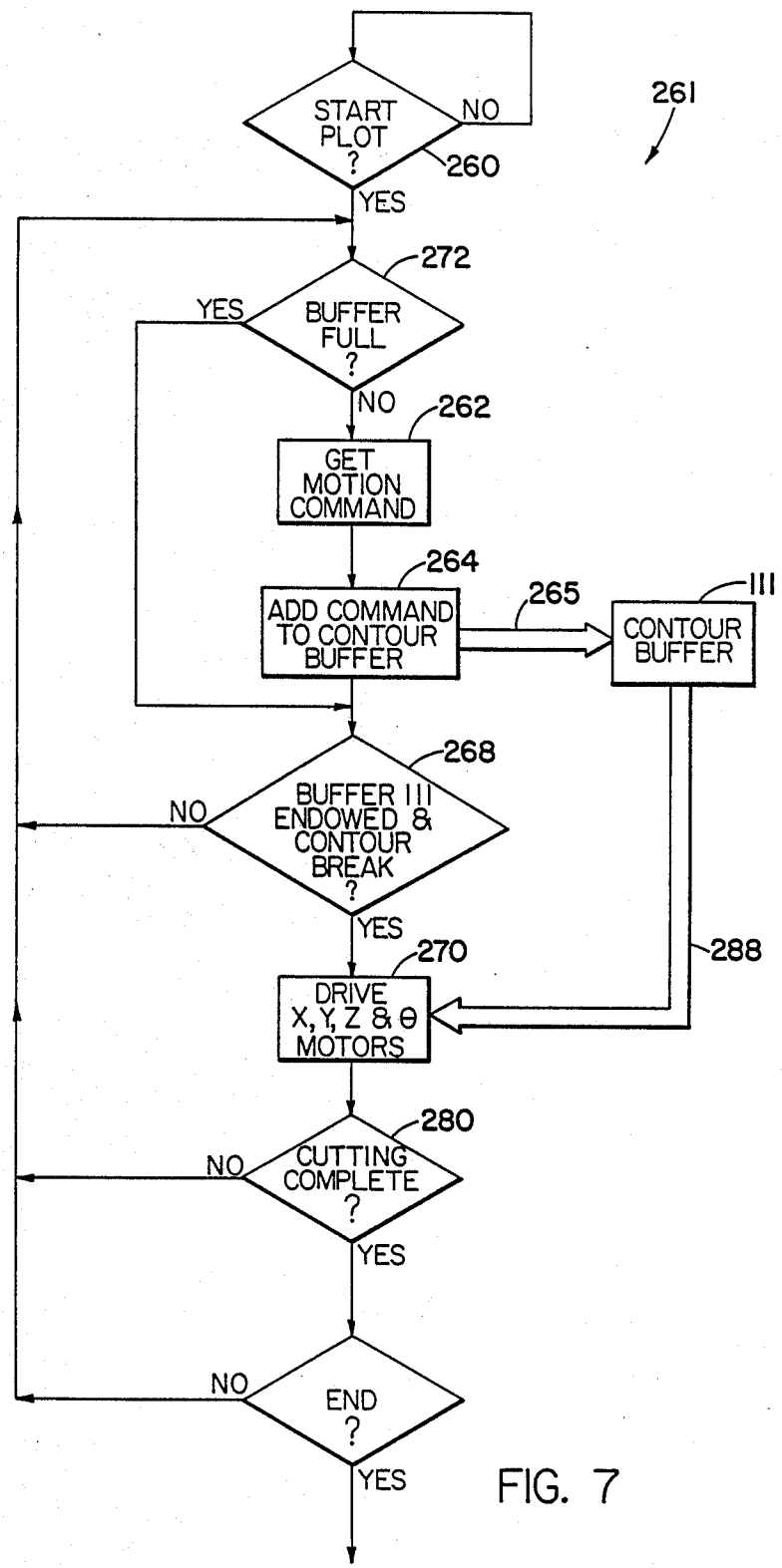
FIG. 7 is a flow chart illustrating a process implemented by a machine controller microprocessor to control a cutting machine of the sign generating apparatus of FIG. 1.

Meanwhile the machine control processor 110 adds the motion command to its buffer 111 (step 264 in FIG. 7). FIG. 7 also illustrates by a double lined arrow 265 the data flow to the machine control buffer 111. Next, the machine control processor 110 determines whether the tool 12 has completed a cutting stroke or contour indicated by a vector stored in its buffer 111(step 268). Because no such vectors have yet been transmitted to the machine control processor 110, the buffer 111 is not sufficiently endowed, and it is not yet time to drive the X and Y servomotors 79 and 86, the machine control processor 110 loops back to the step 272. Because its contour buffer memory 111 is not full the microprocessor 110 requests another motion command from the system microprocessor 80 by setting the interrupt flag on the data line 201. When the system microprocessor 80 reads the interrupt flag, it stores the data of its arithmetic and logic unit, its program counter for the subroutine that it is currently executing and all other volatile data needed to resume the subroutine later, and recalls from its memory the location of the program counter 282 which indicates where it left off with the calculation of the last motion command. In this case, the system microprocessor 80 recognizes that it is time to send a vector indicating the location of the beginning of the first character of the first line of text (state 2) and based on the data contained in plotter buffer 102 and the selected font, calculates a suitable vector, transmits it to the machine control processor 110 and increments its program counter 282. The vector corresponds to the displacement between the current location of the cutting tool 12 and the beginning of the first character. Then, the system microprocessor 80 makes another note in its memory (symbol 3 or the location of the program counter 282) indicating where it is to resume calculating a vector upon the next interrupt by the machine control processor 110, stores any data contained in its arithmatic and logic unit needed for the subsequent calculation and then returns to the subroutine which it was executing before the interruption.

After receiving the vector from the system microprocessor 80, the machine control processor 110 stores the vector in its contour buffer 111 (step 264). This vector indicates the first motion of the tool head 12; however, the machine control processor 110 will not begin to move the tool 12 because its contour buffer does not contain enough motion command vectors to assure continuous motion and so will loop back to the step 262 via the steps 268 and 272. After many iterations through the steps 272, 262, 264 and 268 and a like number of interrupts to the system microprocessor 80, the contour buffer 111 of the machine control processor 110 is sufficiently full to begin the cutting operation. At which time, as indicated by step 270, the machine control processor 110 converts the first of its vectors to servomotor commands for the X and Y motors to begin the cutting operation. As indicated by data lines 285 the machine control processor 110 reads the vectors from the contour buffer 266 and uses the vectors to make the appropriate servomotor calculations. After the X and Y motors are driven according to the first vector, the machine control processor loops back to the step 262 to get another vector from the system microprocessor 80 to refill its contour buffer (step 264). After the X and Y motors have completed the motion corresponding to the first vector, the machine control processor generates new X and Y motor commands based on the second vector.

FIG. 8 illustrates the other states in the sequence of vector calculations made by the system microprocessor 80 and transmissions to the machine control processor 110. After the vector indicating the location of the beginning of the first character, the next vector indicates the first stroke of cutting and the next vector indicates the next stroke in cutting the first character of the first line (state 4). The system microprocessor typically remains in state 4 for a plurality of interrupts and vector transmissions until the last vector of the character (state 5) is transmitted and then proceeds to the state 3 if there are other characters in the same line, to the state 7 if there is another line to cut or to the state 6 if there is no more text to be cut. After all the text is cut, the system microprocessor proceeds to state 8 to calculate and transmit vectors defining optional sign borders or other designs, and then to state 0 to await another set of motion commands for another sign. This other sign may be a repeat of the previous sign or an entirely different sign.

By the foregoing, a sign generating apparatus embodying the present invention has been disclosed. However, numerous substitutions and modifications may be made without deviating from the scope of the invention.

For example, if desired the machine control processor 110 may be connected to the plotter buffer 102 and to the fonts 96,98 . . . 100 via the font memory manager 93 to access the data contained therein and be programmed to generate vectors and other motion commands without the aid of the system microprocessor 80. In this alternate embodiment, the machine control processor 110 would not need to interrupt the system microprocessor 80 as in the main embodiment described above to obtain vectors and other motion commands and would be substantially self-sufficient once the plotter buffer 102 is provided with data defining a layed out sign. However, in this alternate embodiment the system microprocessor 80 and the machine control processor 110 would have to coordinate their access to the plotter buffer 102 and the font memory manager 93 by suitable "busy signals" presented by the font memory manager 93 and plotter buffer 102 when being accessed or controlled by either microprocessor.

Therefore, the aforesaid detailed description discloses representative embodiments of the invention the scope of which invention being defined by the following claims.

We claim:
1. A sign generating apparatus comprising:
keyboard means for receiving first sign data and second sign data,
processor means, for interrogating said keyboard means and supervising said first sign data entry during first intervals and said second sign data entry during second intervals, and
means for cutting a first sign based in part on said first sign data and a second sign based in prrt on said second sign data, and wherein
said processor means also includes means for generating cutting vectors defining said first sign and indicating a cutting course for the cutting means, said processor further supplying said cutting vectors to the cutting means between said second intervals so that the cutting means cuts said first sign while said second sign data is received through said keyboard means.

2. A sign generating apparatus as set forth in claim 1, wherein
the cutting means includes means for generating an interrupt signal when the cutting means requires a cutting vector to further indicate said cutting course and transmitting said interrupt signal to said processor means, and
said processor means includes means for recognizing said interrupt signal and servicing said cutting means by providing said vector before said cutting means must halt due to lack of said cutting vectors.

3. A sign generating apparatus as set forth in claim 2 wherein:
said processor means further includes a means for responding to said interrupt signals from said cutting means before supervising the next data entry through said keyboard means.

4. A sign generating apparatus as set forth in claim 3 wherein:
said processor means further includes means for supplying cutting vectors defining the shape of sign characters in the first and second signs, and
said cutting means comprises a cutting tool, X and Y motors for moving said cutting tool and sign generating material relative to one another in an X-Y plane, storage means for storing at any given time less than all of the cutting vectors defining the shape of said sign characters and another processor means for converting said vectors to motor control signals for said X and Y motors to cause said motors to move in a course corresponding to said sign characters.

5. A sign generating apparatus as set forth in claim 2, wherein:
said processor means also includes subroutine means for determining a first sign layout based on said first sign data and a second sign layout based on said second sign layout.

6. A sign generating apparatus as set forth in claim 5 wherein:
the subroutine mean includes a sequence of program instructions which are followed during operation of the subroutine means; and
said processor means includes means for interrupting the operation of the subroutine means at a program instruction for determining said second sign layout in response to said interrupt by said cutting means requesting a cutting vector defining said first sign and then returning to the operation of said subroutine means at said interrupting program instruction.

7. A sign generating apparatus as set forth in claim 6 wherein said processor means further includes a means for storing a program count and volatile data corresponding to a program instruction in said subroutine means when interrupted by said cutting means, and after supplying said cutting vector to said cutting means, responding to said program count and said volatile data to continue operation of said subroutine means.

8. A sign generating apparatus as set forth in claim 1 wherein
said processor means, in performing its supervisory function, further includes a means for reading and storing the first and second data entries.

9. A sign generating apparatus as set forth in claim 8 further comprising
first memory means controlled by said processor means for storing said first sign data during entry of said first sign data, and
second memory means controlled by said processor means and connected in operative relation with said first memory means for subsequently storing said first sign data, said processor means transferring said first sign data from said first memory means to said second memory means before the cutting means cuts said first sign, said processor means utilizing said first sign data located in said second memory means to determine said cutting vectors for said first sign.

10. A sign generating apparatus as set forth in claim 1 further comprising:
display means connected in operative relation with said processor means and including a video monitor for displaying said first and second signs, said processor supplying display vectors to the displaying means defining said first and second sign layouts, and wherein
the cutting means includes means for generating an interrupt signal when a cutting vector is required to further indicate said cutting means cutting course and transmitting said interrupt signal to said processor means, and
said processor means includes means for interrupting its supply of vectors to the displaying means in response to said interrupt signal and supplying a cutting vector to said cutting means defining said first sign and then automatically returning to its supply of display of vectors so that the displaying means substantially continuously develops the display of said second sign.

11. A sign generating apparatus as set forth in claim 10 further comprising:
a bank of different fonts connected in operative relation with said processor means and defining the shape of characters of said first and second sign data, said processor means including means for accessing said bank of fonts to support both its cutting vector determination and its displaying vector determinations.

12. A sign generating apparatus comprising:
keyboard means for entering first sign data and second sign data,
processor means connected in operative relation with said keyboard means for determining a first sign layout based on said first sign data and a second sign layout based on said second sign data,
said processor means includes means for receiving said second sign data entered through said keyboard means during entry intervals, and includes means for supplying cutting vectors to the cutting means in between said entry intervals in which said processor means receives said second signal data,
said cutting means utilizing said vectors to cut said first sign, and
means for cutting a first sign according to said first sign layout while said second sign data is entered through said keyboard means and for subsequently cutting a second sign according to said second sign layout.

13. A sign generating apparatus as set forth in claim 12 wherein:
the cutting means is programmed to transmit an interrupt request to said processor means when a cutting vector is required, and
said processor means includes means responsive to the interrupt request for interrupting determination of said second sign layout by said processor means, means for storing program data derived from its determination of said second sign layout at the time of interruption, means for calculating and transmitting said cutting vector in response to said interrupt request, and means for returning to its determination of said record sign layout where it left off utilizing said data derived at the time of interruption.

14. A process for efficiently making signs utilizing a sign cutting apparatus, said process comprising the steps of:
making an entry of first data on a keyboard, said first data describing a first sign,
processing said first data to define a first sign layout based on said first data,
transmitting cutting information defining a portion of said first sign layout to said sign cutting apparatus, and cutting a portion of said first sign,
making a first entry of second data on said keyboard, said second data describing at least a portion of a second sign,
making a second entry of second data on the keyboard, said second entry of second data describing another portion of said second sign wherein
the step of transmitting cutting information to said sign cutting apparatus is performed between the steps of making the first and second entries of second data.

15. A process as set forth in claim 14 further comprising the subsequent steps of:
processing a first portion of said second data to define a portion of a second sign layout based on said second data and then processing a second portion of said second data to define another portion of the second sign layout wherein an additional step of transmitting cutting information defining a portion of said first sign layout is performed between the steps of processing the first and second portions of said second data.

16. A process as set forth in claim 15 further comprising the step of:
transmitting an interrupt from said sign cutting apparatus to a controller responsible for transmitting said first cutting information, to indicate a need for said first information after the first step of making said entry of said seocnd data.

17. In a sign generating apparatus having a cutting instrument, an X-motor for providing relative movement between said cutting instrument and sign cutting material along an X-coordinate axis and Y-motor for providing relative movement of said cutting instrument and said cutting material along a Y-coordinate axis, the improvement comprising:

keyboard means for inputting data defining first and second sign text and first and second sign parameters, first processor means for determining a first sign layout based on said first sign text and said first sign parameter data and reading said second sign text and said second sign parameter data, means for storing data defining said first sign layout, and second processor means for directing the movement of said X and Y motors to cut a sign according to direction vectors, said first processor means including a means for converting said stored data defining said first sign layout into said direction vectors and supply them to said second processor means while said first processor means reads said second sign text and said second sign parameter data which in input through said keyboard means.

18. An improvement in a sign generating apparatus as set forth in claim 17 wherein, said second processor includes means for requesting said direction vectors by transmitting interrupts to said first processor means, and said first processor means is programmed to interrupt the second sign text and data reading when requested by said second processor means to provide an additional direction vector for said first sign and then return to said second sign text and data reading.

19. A sign generating apparatus comprising:

display means for displaying a layout of first sign data and second sign data, processor means for supervising said first sign data displaying during first intervals and said second sign data displaying during second intervals, and means for cutting a first sign based in part on said first sign data and a second sign based in part on said second sign data, and wherein said processor means also includes means for supplying cutting vectors to the cutting means in between said second intervals, said cutting vectors defining said first sign and indicating a cutting course for the cutting means, so that the cutting means cuts said first sign while said second sign data is displayed by said display means.

* * * * *